United States Patent
Lai et al.

(10) Patent No.: US 6,982,777 B2
(45) Date of Patent: Jan. 3, 2006

(54) LIQUID CRYSTAL DISPLAY HAVING A PAIR OF STRIPE SHAPED SECOND SEAL PATTERNS AND FABRICATING METHOD THEREOF

(75) Inventors: Tzu-Yuan Lai, Taichung (TW); Dai-Liang Ting, Hsinchu (TW); Chi-Jian Wen, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 176 days.

(21) Appl. No.: 10/453,001

(22) Filed: Jun. 3, 2003

(65) Prior Publication Data

US 2004/0080702 A1 Apr. 29, 2004

(30) Foreign Application Priority Data

Oct. 24, 2002 (TW) ..................... 91124760 A

(51) Int. Cl.
*G02F 1/1339* (2006.01)

(52) U.S. Cl. ...................................... 349/153
(58) Field of Classification Search ........... 349/153, 349/155
See application file for complete search history.

(56) References Cited

U.S. PATENT DOCUMENTS

| | | | | |
|---|---|---|---|---|
| 4,640,583 A | * | 2/1987 | Hoshikawa et al. | 349/153 |
| 5,335,103 A | * | 8/1994 | Kim | 349/154 |
| 5,933,209 A | * | 8/1999 | Yonemoto | 349/153 |
| 6,222,603 B1 | * | 4/2001 | Sakai et al. | 349/153 |

* cited by examiner

*Primary Examiner*—Tarifur R. Chowdhury
(74) *Attorney, Agent, or Firm*—Quintero Law Office

(57) ABSTRACT

A liquid crystal display (LCD) and fabricating method thereof. The fabricating method includes providing a double-layered substrate structure having a first seal pattern, inserted along the periphery thereof, wherein the first seal pattern has a notch for liquid crystal injection, facing an injecting direction of the liquid crystals, forming a second seal pattern near the notch, parallel to the injecting direction, injecting the liquid crystals via the notch along the injecting direction, and sealing the notch with a third seal pattern. According to the invention, the permeating rate of the third seal pattern is accelerated, enhancing the sealing of the liquid crystal display, and increasing productivity. Further, the second seal pattern enhances the adhesion between the substrate and the third seal pattern, protecting the cured third seal pattern from peeling and bubble formation.

18 Claims, 8 Drawing Sheets

LIQUID CRYSTAL DISPLAY HAVING A PAIR OF STRIPE SHAPED SECOND SEAL PATTERNS AND FABRICATING METHOD THEREOF

BACKGROUND OF THE INVENTION

1. Field of the Invention

The present invention relates to a liquid crystal display and fabricating method thereof, and more particularly to a method enhancing sealing of the liquid crystal display.

2. Description of the Related Art

Liquid crystal display (LCD) is a commonly used flat panel technology. Owing to dielectric anisotropy and conductive anisotropy of liquid crystal molecules, molecular orientation of liquid crystals can be shifted under an external electronic field, such that various optical effects are produced.

An LCD panel is generally made up of two substrates, with a gap preserved therebetween, and a liquid crystal layer filled within the gap. Respective electrodes are formed on the two substrates, respectively, to control the orientation and shift of liquid crystal molecules.

A TFT (thin film transistor) LCD panel is generally made up of a TFT array substrate and a color filter substrate. The two substrates are first manufactured separately, then aligned and joined together. During the combining of the two substrates, generally referred to as cell process, spacers are spread over the liquid crystal chips to maintain and even the cell gap between the two substrates, and a seal pattern is formed along the periphery of each liquid crystal chip to adhere the two substrates after curing, sustaining the two-layered unit. Afterwards, the two-layered unit is broken to divide each liquid crystal chip into an independent double-layered unit, having a notch therebetween for liquid crystal injection. The notch is then sealed after injection of liquid crystals to complete the fabrication of the LCD panel.

The sealant applied in the current cell process for LCD can be, for example, epoxy or polyacrylate, first in a fluid state, and then thermally-cured or photo-cured to complete sealing. In the cell process of a large-scale LCD panel, a step of applying uniform pressure on the two substrates is usually performed, between the injection of liquid crystals and sealing of the notch, to spread the liquid crystals uniformly, expel the redundant material, and create a slight pressure therein, drawing the sealant into the notch in the subsequent step, enhancing the permeating rate of the sealant, and assuring sufficient permeating depth thereof. In the cell process of a small-scale LCD panel, however, applying a similar step for each small panel is time-consuming, thus the notch is usually sealed directly after the injection of liquid crystals. Owing to the absence of the slight pressure within the double-layered unit, the sealing time or length of sealant application must be prolonged to compensate for the slow-down of permeating rate.

Further, polymeric material is used in the cell process as a sealant because of its resistance to environmental effects, chemicals, and adhesion, but peeling or bubble formation may occur after curing the sealant, if improper sealant, curing temperature, or curing time is applied.

SUMMARY OF THE INVENTION

Accordingly, an object of the present invention is to facilitate the permeating rate of sealant, and provide better sealing properties.

Therefore, the invention provides a fabricating method for a liquid crystal display, comprising providing a double-layered substrate structure having a first seal pattern, inserted along the periphery thereof, wherein the first seal pattern has a notch for liquid crystal injection, facing an injecting direction of the liquid crystals, forming a pair of stripe-shaped second seal patterns with a space therebetween, parallel to the injecting direction, injecting the liquid crystals via the notch along the injecting direction, and sealing the notch with a third seal pattern, wherein the third seal pattern does not fill the space.

The invention further provides a liquid crystal display, comprising a double-layered substrate structure having a first seal pattern, inserted along the periphery thereof and filled with liquid crystals, wherein the first seal pattern has a notch facing an injecting direction of the liquid crystals, a pair of stripe-shaped second seal patterns with a space therebetween, and a third seal pattern sealing the notch, wherein the third seal pattern does not fill the space.

According to the invention, the permeating rate of the third seal pattern is accelerated, thereby the sealing of the liquid crystal display is enhanced, and productivity is increased. Further, the second seal pattern enhances the adhesion between the substrate and the third seal pattern, preventing the cured third seal pattern from peeling and forming bubbles.

According to the invention, the second seal pattern near the notch can be any shape, preferably striped, forming above the notch or in the vicinity of the notch.

According to the invention, the second seal pattern, perpendicular to the injecting direction of liquid crystals, is formed near the notch, thereby enhancing permeation of the third seal pattern into the notch in the sealing step, and increasing productivity.

According to the invention, the second seal pattern can further comprise a stripe perpendicular to the injecting direction, forming an L-shaped pattern together with the stripe parallel to the injecting direction, and preventing the permeation of external moisture.

The first, second and third seal patterns are preferably made of low-permeability material, wherein the first and the third seal patterns can be made of the same material. The second seal pattern is preferably a sealant having higher adhesion to the third seal pattern than the substrate, acting as an adhesive medium between the substrate and the third seal pattern, such that the adhesion therebetween is enhanced, and sealing properties are improved.

DESCRIPTION OF THE DRAWINGS

The present invention can be more fully understood by reading the subsequent detailed description and examples with references made to the accompanying drawings, wherein.

DETAILED DESCRIPTION OF THE INVENTION

In the embodiments, the first, second and third seal patterns are preferably made of low-permeability material, wherein the first and the third seal patterns can be of the same material. The first and the third seal patterns can be UV curable sealant or thermosetting sealant, for example, epoxy or polyacrylate. The second seal pattern is preferably made of a material having higher adhesion to the third seal pattern than the substrate, for example, indium tin oxide (ITO) or indium zinc oxide (IZO).

First Embodiment

Figure 1A:
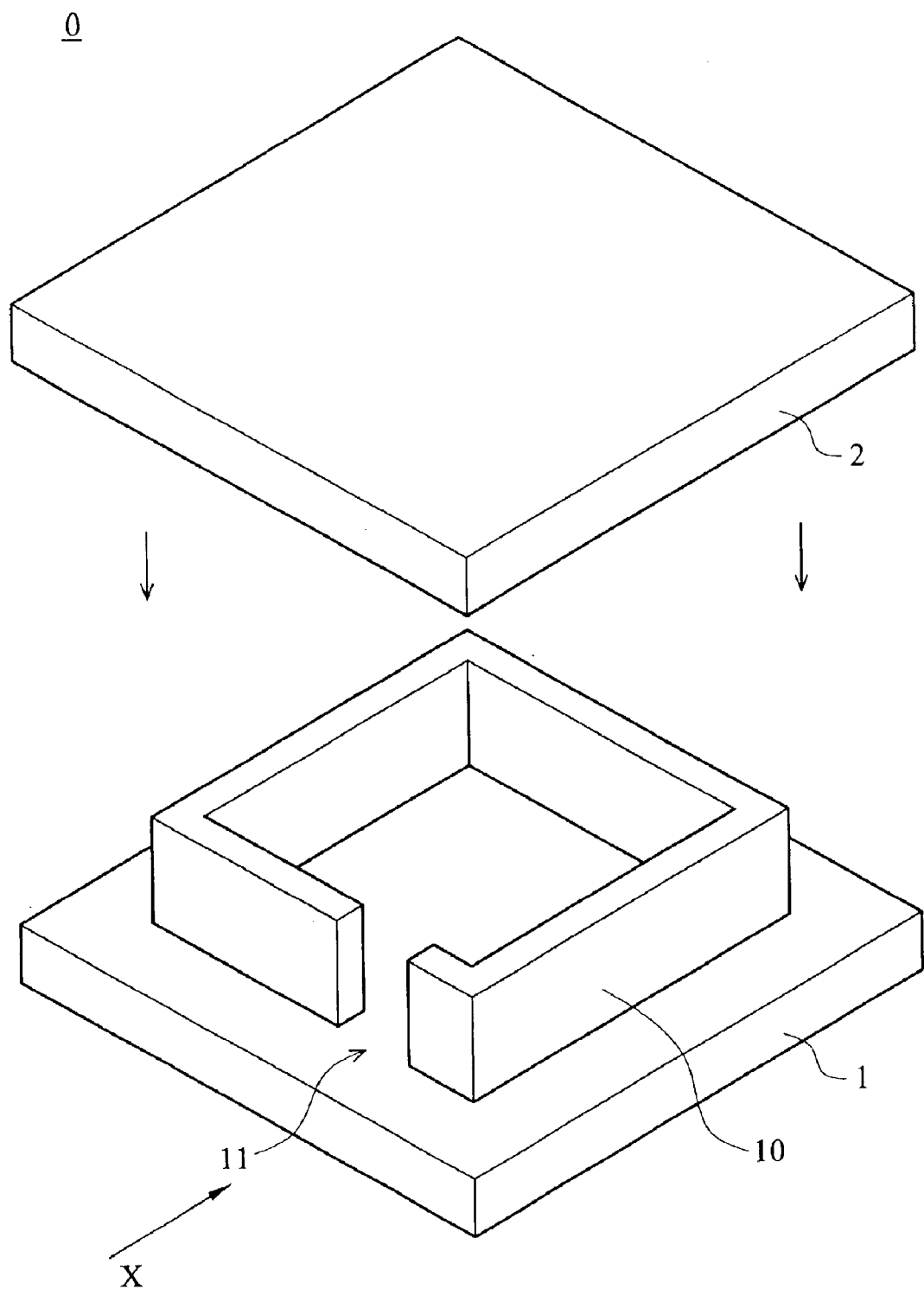
FIGS. 1a–1d show an manufacturing process of a liquid crystal display in the first embodiment.

In FIG. 1a, a double-layered substrate structure 0, made up of a substrate 1 and another substrate 2, is provided. A color filter (not shown) and TFTs (not shown) are formed respectively on the substrates 1 and 2. A first seal pattern 10 is inserted between the substrate 1 and substrate 2 along the periphery thereof, having a notch 11 facing an injecting direction x of liquid crystals.

Figure 1B:
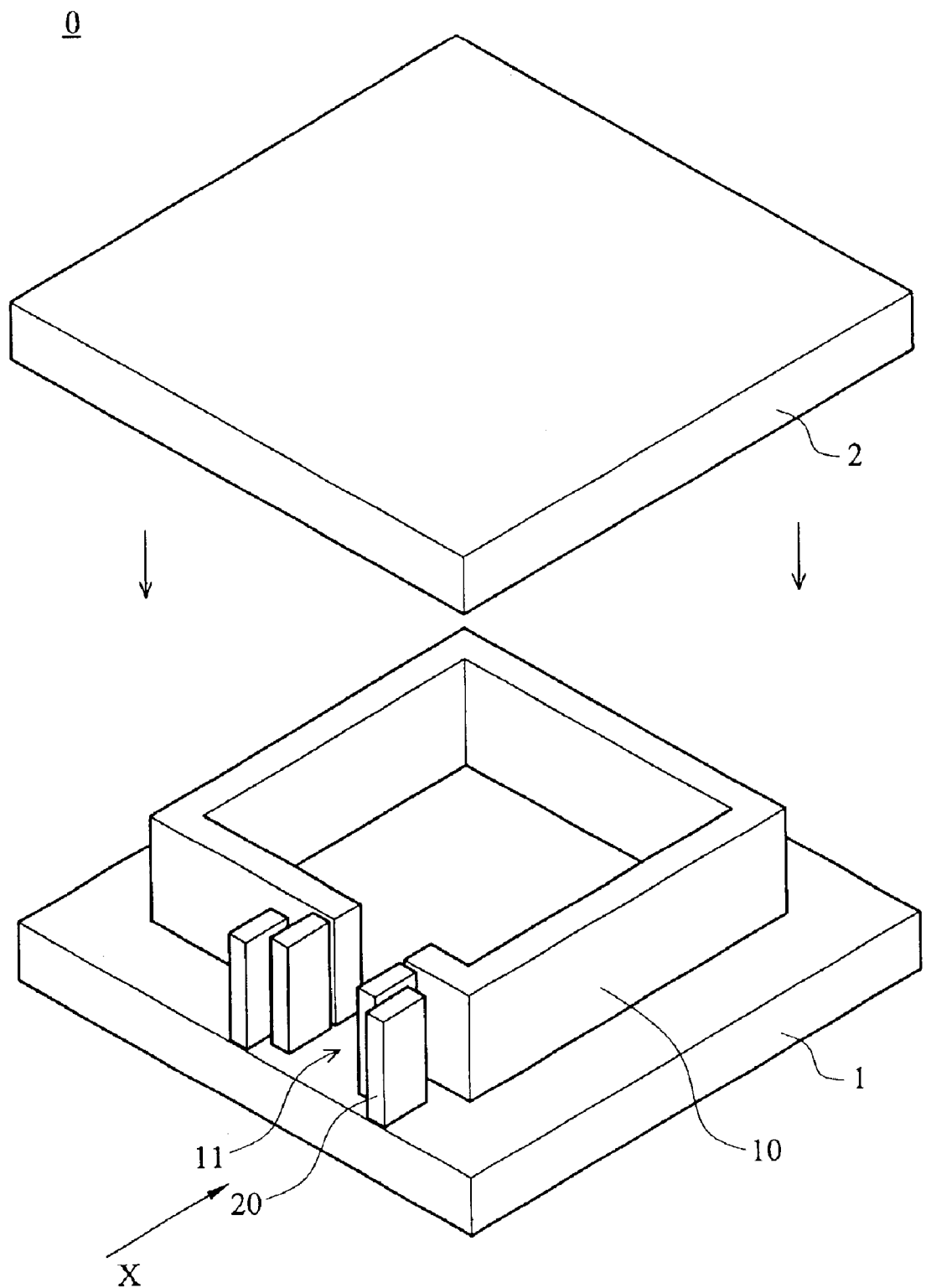
Figure 1C:
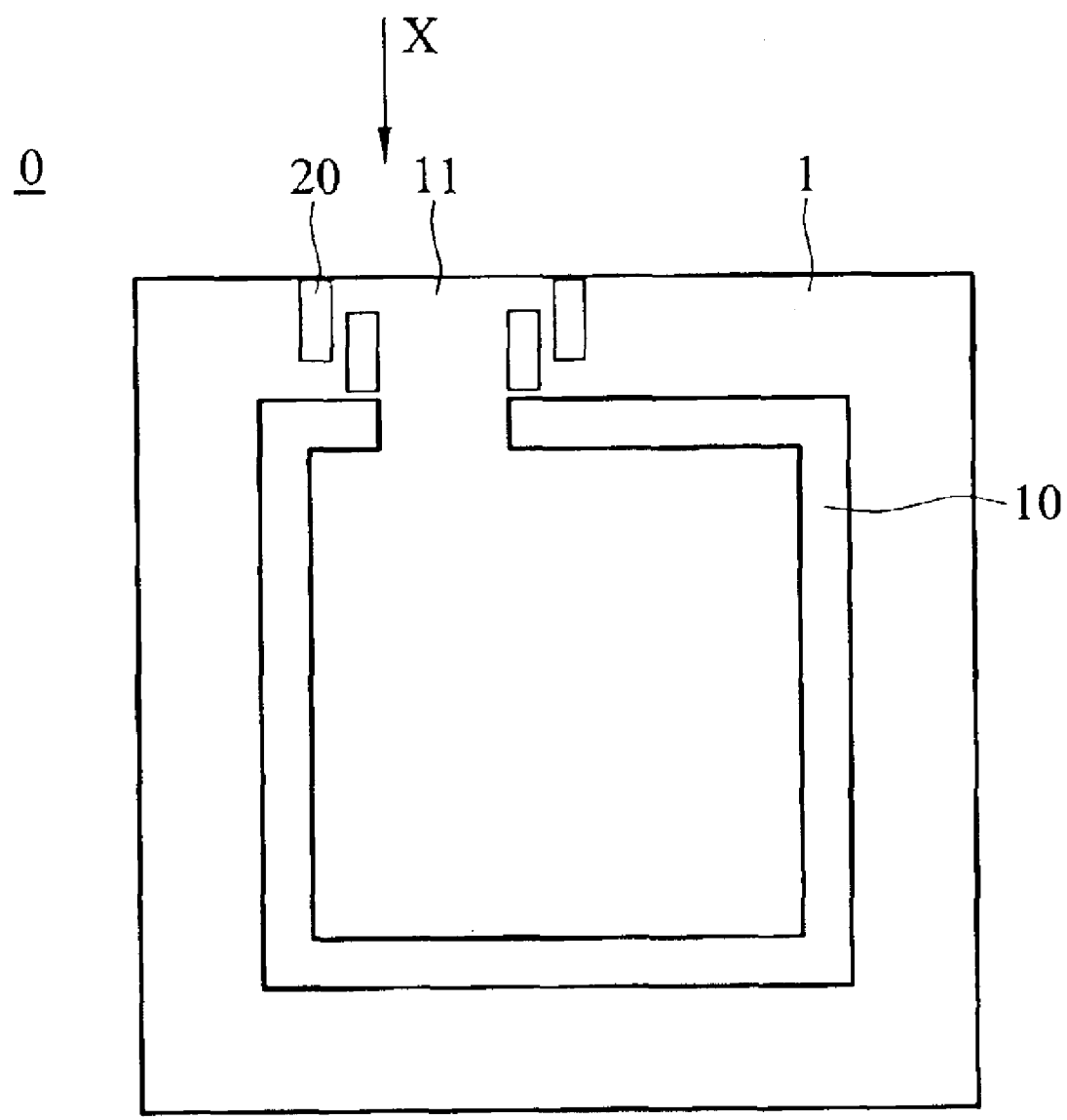

In FIG. 1b, a second seal pattern 20 is formed, along the injecting direction x, near the notch 11. The second seal pattern 20 can be formed in the notch, above the notch, or in the vicinity of the notch. The shape of the second seal pattern 20 is not limited, but preferably striped. FIG. 1c is a top view showing the position of the second seal pattern 20. The seal pattern 20 can also be fabricated, on substrate 1 or substrate 2, prior to the cell process of the double-layered substrate structure 0.

Figure 1D:
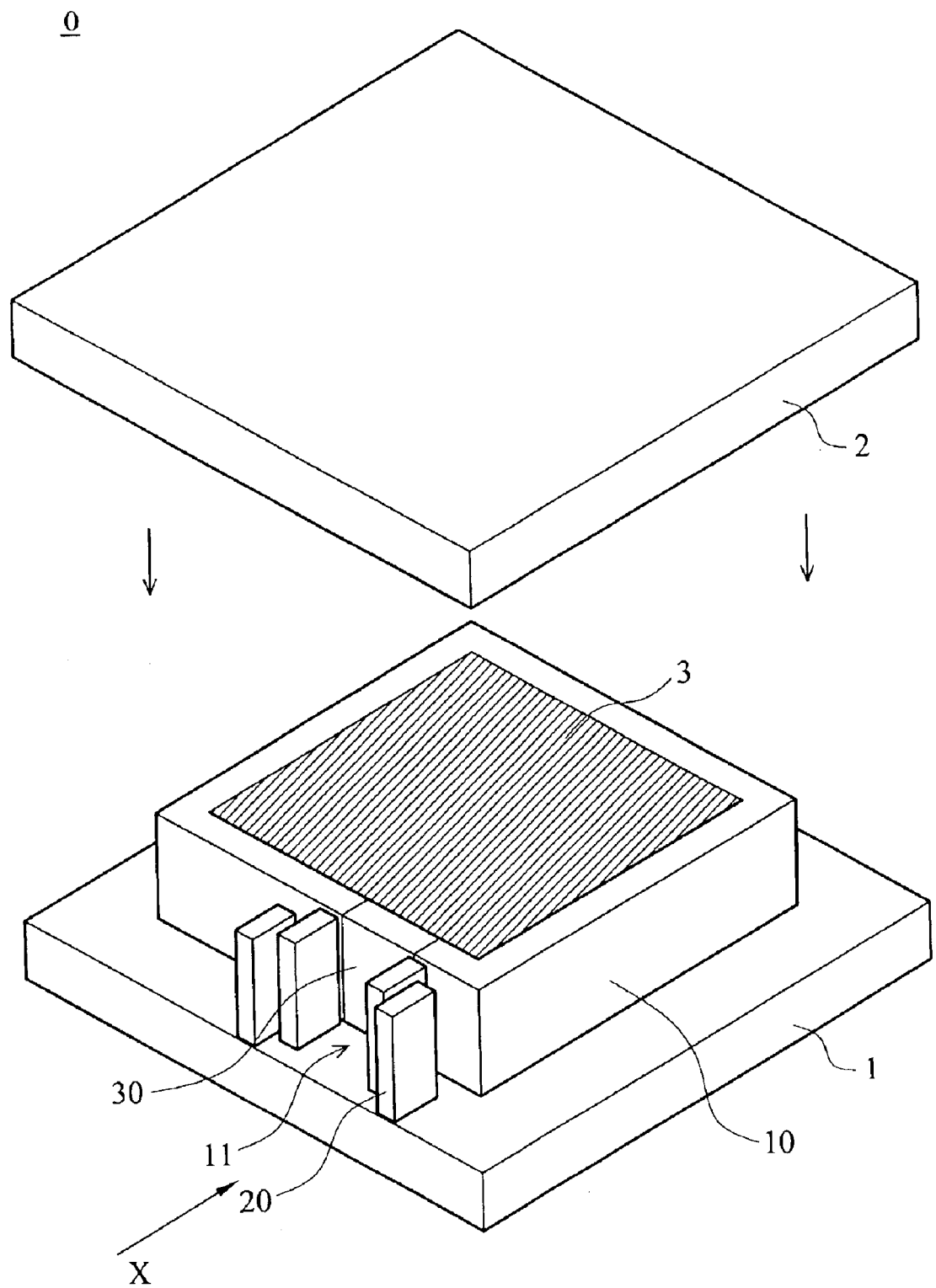

In FIG. 1d, liquid crystals 3 are then injected via the notch 11 into a cell within the double-layered substrate structure 0. A third seal pattern 30 is then applied to seal the notch 11, thereby completing the LCD panel.

In the embodiment, the second seal pattern 20, perpendicular to the injecting direction x of liquid crystals, is formed near the notch 11, thereby enhancing permeation of the third seal pattern 30 into the notch 11 in the sealing step, and increasing productivity.

The first seal pattern 10, second seal pattern 20 and the third seal pattern 30 are made of materials having low permeability to water. The second seal pattern 20 is made of ITO, having higher adhesion to the third seal pattern 30 than the double-layered substrate structure 0, acting as an adhesive medium between the double-layered substrate structure 0 and the third seal pattern 30, such that the adhesion therebetween is enhanced, and sealing properties are improved.

Second Embodiment

Figure 2A:
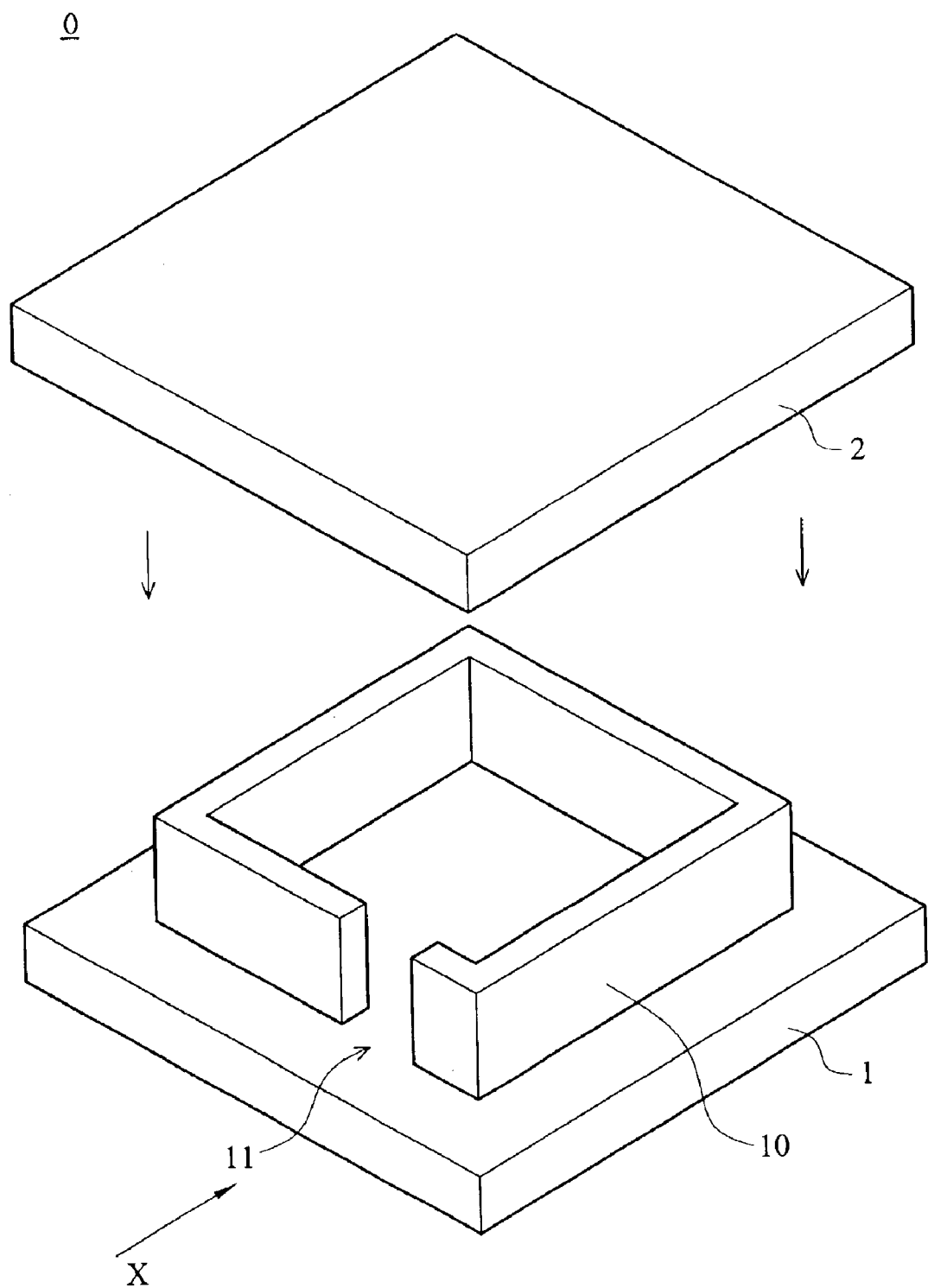
FIGS. 2a–2d show an manufacturing process of a liquid crystal display in the second embodiment.

In FIG. 2a, a double-layered substrate structure 0, made up of a substrate 1 and another substrate 2, is provided. A color filter (not shown) and TFTs (not shown) are formed respectively on the substrates 1 and 2. A first seal pattern 10 is inserted between the substrate 1 and substrate 2 along the periphery thereof, having a notch 11 facing an injecting direction x of liquid crystals.

Figure 2B:
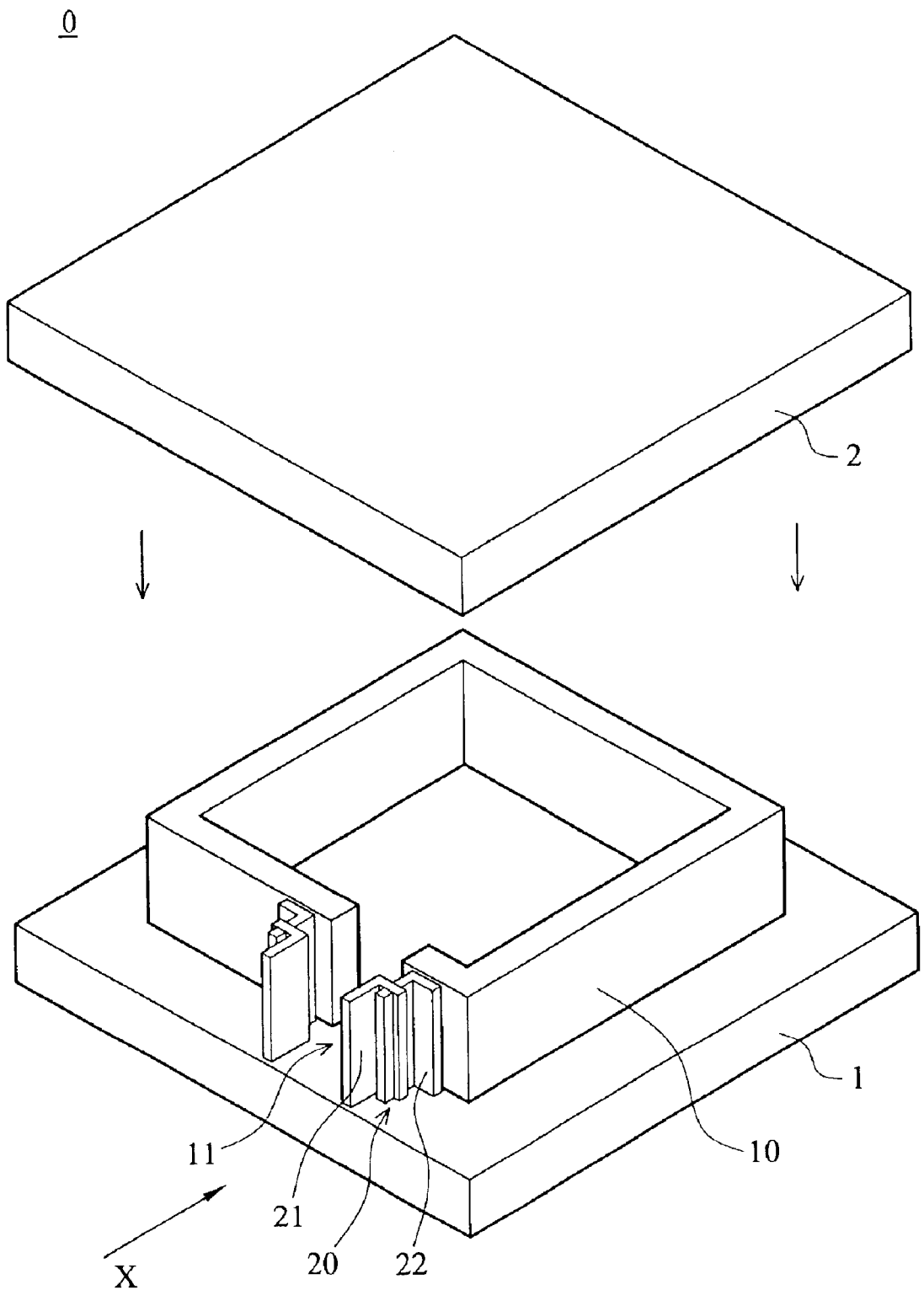

In FIG. 2b, a second seal pattern 20 is formed near the notch 11. The second seal pattern 20 includes a stripe 21, along the injecting direction x of the liquid crystals above the notch 11, and a stripe 22, perpendicular to the injecting direction x and forming an L-shaped pattern together with the stripe 21.

Figure 2C:
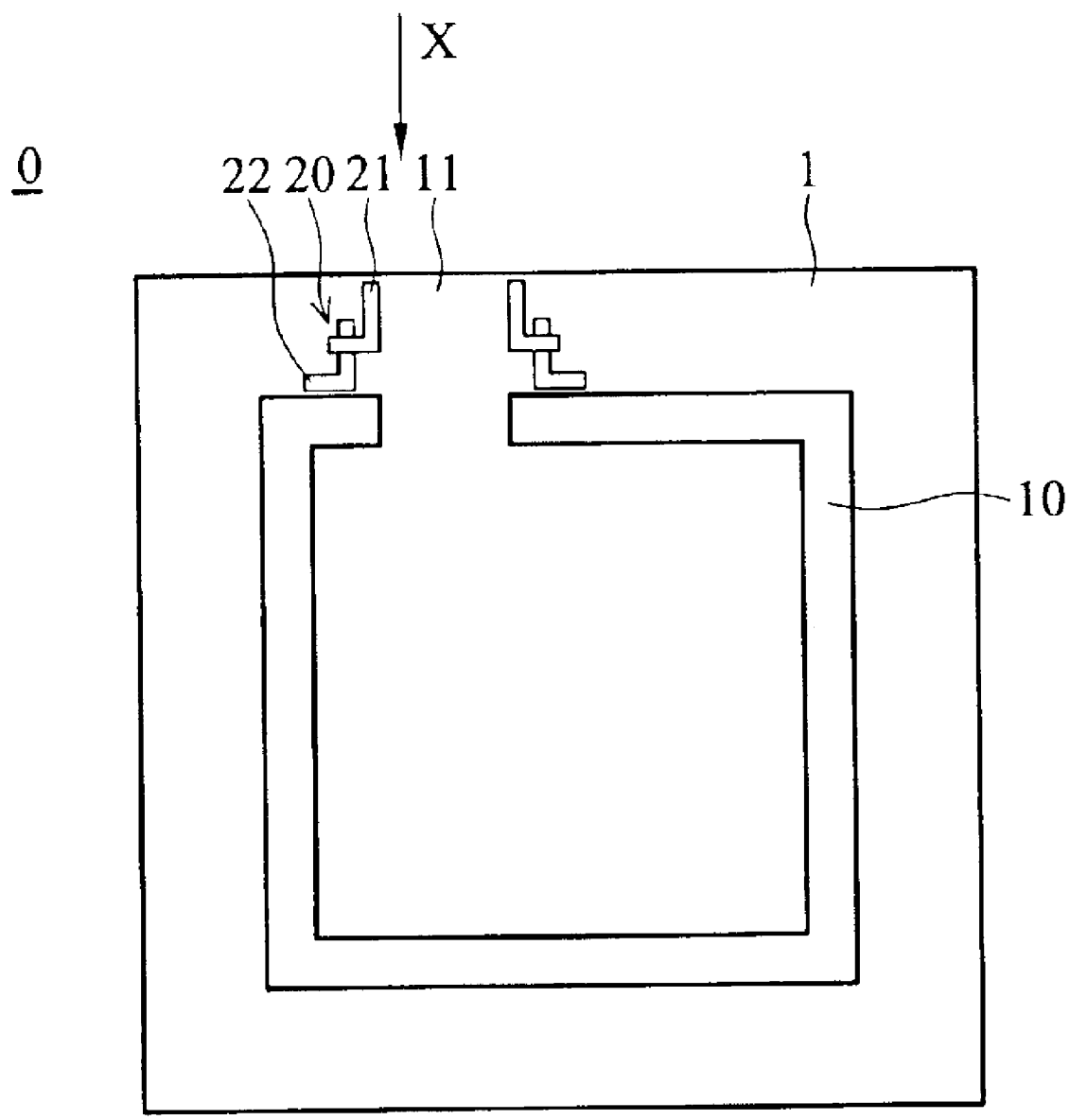

FIG. 2c is a top view showing the position of the second seal pattern 20. According to the embodiment, the L-shaped pattern has the further benefit of preventing the permeation of external moisture. Furthermore, the seal pattern 20 can also be fabricated, on substrate 1 or substrate 2, prior to the cell process of the double-layered substrate structure 0.

Figure 2D:
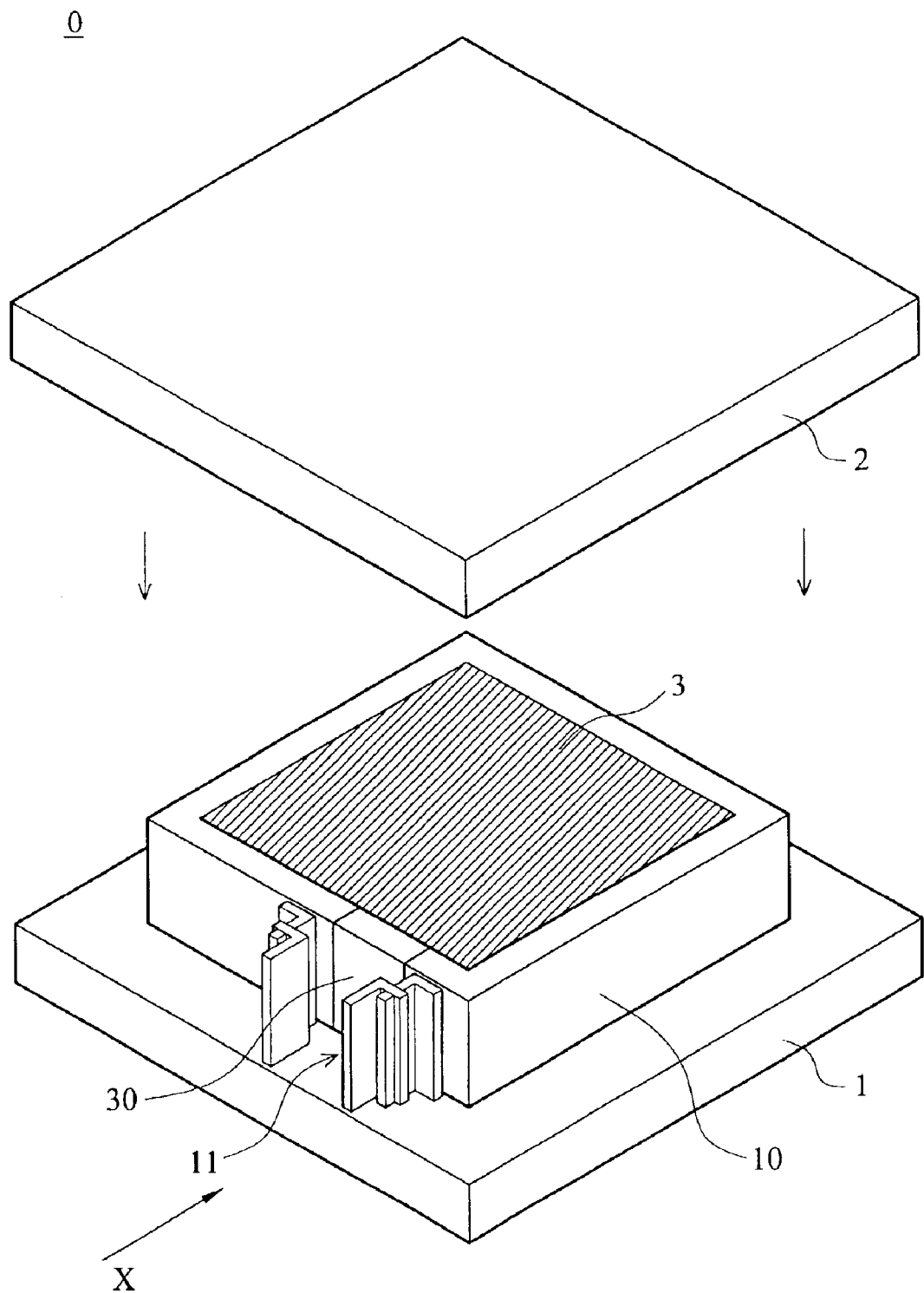

In FIG. 2d, liquid crystals 3 are then injected via the notch 11 into a cell within the double-layered substrate structure 0. A third seal pattern 30 is then applied to seal the notch 11, thereby completing the LCD panel.

In the embodiment, the second seal pattern 20, perpendicular to the injecting direction x of liquid crystals, is formed near the notch 11, thereby enhancing permeation of the third seal pattern 30 into the notch 11 in the sealing step, and increasing productivity.

The first seal pattern 10, second seal pattern 20 and the third seal pattern 30 are made of materials having low permeability to water. The second seal pattern 20 is made of ITO, having higher adhesion to the third seal pattern 30 than the double-layered substrate structure 0, acting as an adhesive medium between the double-layered substrate structure 0 and the third seal pattern 30, such that the adhesion therebetween is enhanced, and sealing properties are improved.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal display, comprising:
    a double-layered substrate structure having a first seal pattern, inserted along the periphery thereof and filled with liquid crystals, wherein the first seal pattern has a notch facing an injecting direction of the liquid crystals;
    a pair of stripe-shaped second seal patterns with a space therebetween , parallel to the injecting direction; and
    a third seal pattern sealing the notch and not filling the space.

2. The liquid crystal display as claimed in claim 1, wherein the double-layered substrate structure is formed by a first substrate provided with a color filter and a second substrate provided with thin film transistors.

3. The liquid crystal display as claimed in claim 1, wherein the second seal pattern is striped.

4. The liquid crystal display as claimed in claim 1, wherein the second seal pattern is fabricated on one of the substrates prior to the formation of the double-layered substrate structure.

5. The liquid crystal display as claimed in claim 1, wherein the second seal pattern further comprises a stripe perpendicular to the injecting direction, forming an L-shaped pattern together with the stripe parallel to the injecting direction.

6. The liquid crystal display as claimed in claim 1, wherein the first, second and third seal patterns are made of low-permeability sealant.

7. The liquid crystal display as claimed in claim 1, wherein the first and third seal patterns are made of the same sealant.

8. The liquid crystal display as claimed in claim 1, wherein the second seal pattern is made of indium tin oxide (ITO) or indium zinc oxide (IZO).

9. A method of fabricating a liquid crystal display, comprising:
    providing a double-layered substrate structure having a first seal pattern, inserted along the periphery thereof, wherein the first seal pattern has a notch for liquid crystal injection, facing an injecting direction of the liquid crystals;
    forming a pair of stripe-shaped second seal patterns with a space therebetween, parallel to the injecting direction;

injecting the liquid crystals via the notch along the injecting direction; and sealing the notch with a third seal pattern, the third seal pattern not filling the space.

10. The method as claimed in claim 9, wherein the double-layered substrate structure is formed by a first substrate provided with a color filter and a second substrate provided with thin film transistors.

11. The method as claimed in claim 9, wherein the second seal pattern is striped.

12. The method as claimed in claim 9, wherein the second seal pattern is fabricated on one of the substrates prior to the formation of the double-layered substrate structure.

13. The method as claimed in claim 11, wherein the second seal pattern further comprises a stripe perpendicular to the injecting direction, forming an L-shaped pattern together with the stripe parallel to the injecting direction.

14. The method as claimed in claim 9, wherein the first, second and third seal patterns are made of low-permeability sealant.

15. The method as claimed in claim 10, wherein the first and third seal patterns are made of the same sealant.

16. The method as claimed in claim 9, wherein the second seal pattern is made of indium tin oxide (ITO) or indium zinc oxide (IZO).

17. The liquid crystal display as claimed in claim 1, wherein each of the second seal patterns comprises two L-shaped patterns intersecting with each other.

18. The method as claimed in claim 9, wherein each of the second seal patterns comprises two L-shaped patterns intersecting with each other.

* * * * *